Nov. 17, 1931.  H. CHRISMAN ET AL  1,831,903
REDUCTION GEARING
Filed June 21, 1928   2 Sheets-Sheet 1
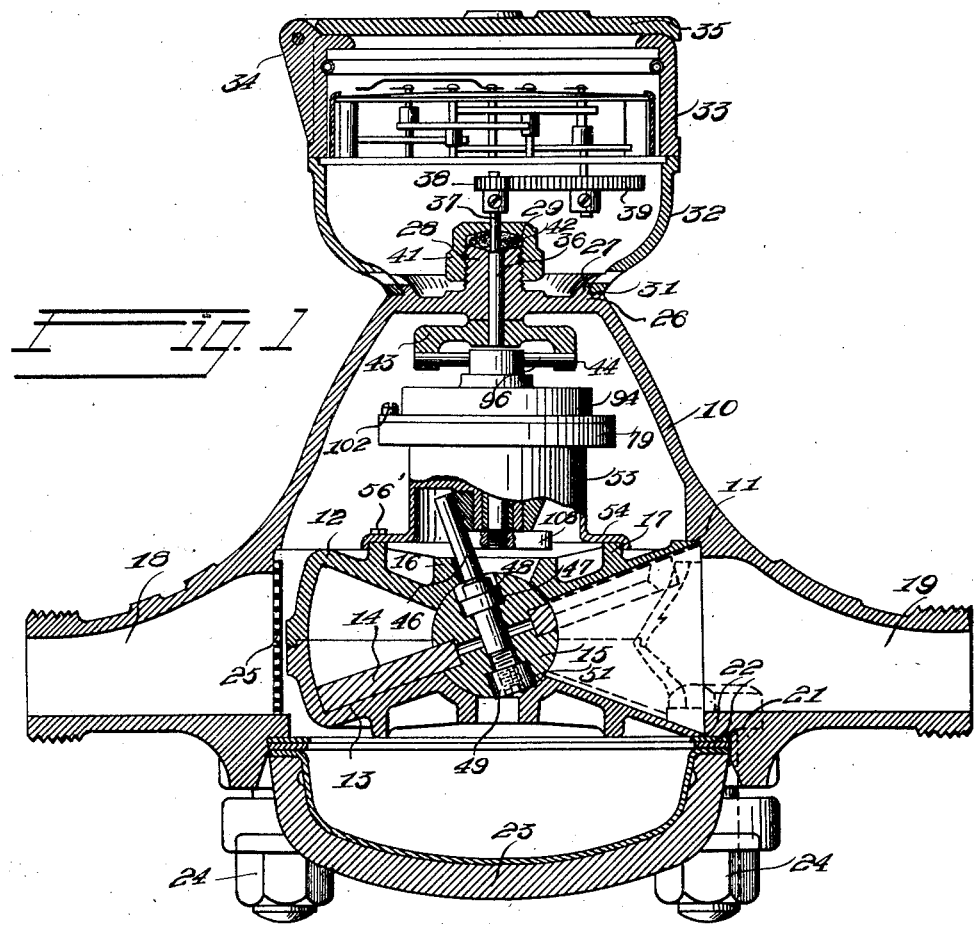
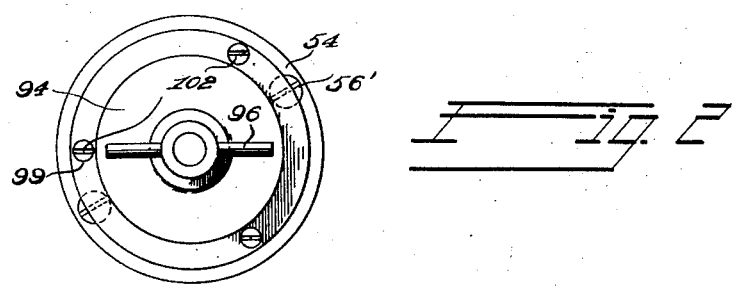
INVENTORS
Allen D. MacLean
Horace Chrisman
BY William A. Strauch
ATTORNEYS.

Nov. 17, 1931.   H. CHRISMAN ET AL   1,831,903
REDUCTION GEARING
Filed June 21, 1928   2 Sheets-Sheet 2
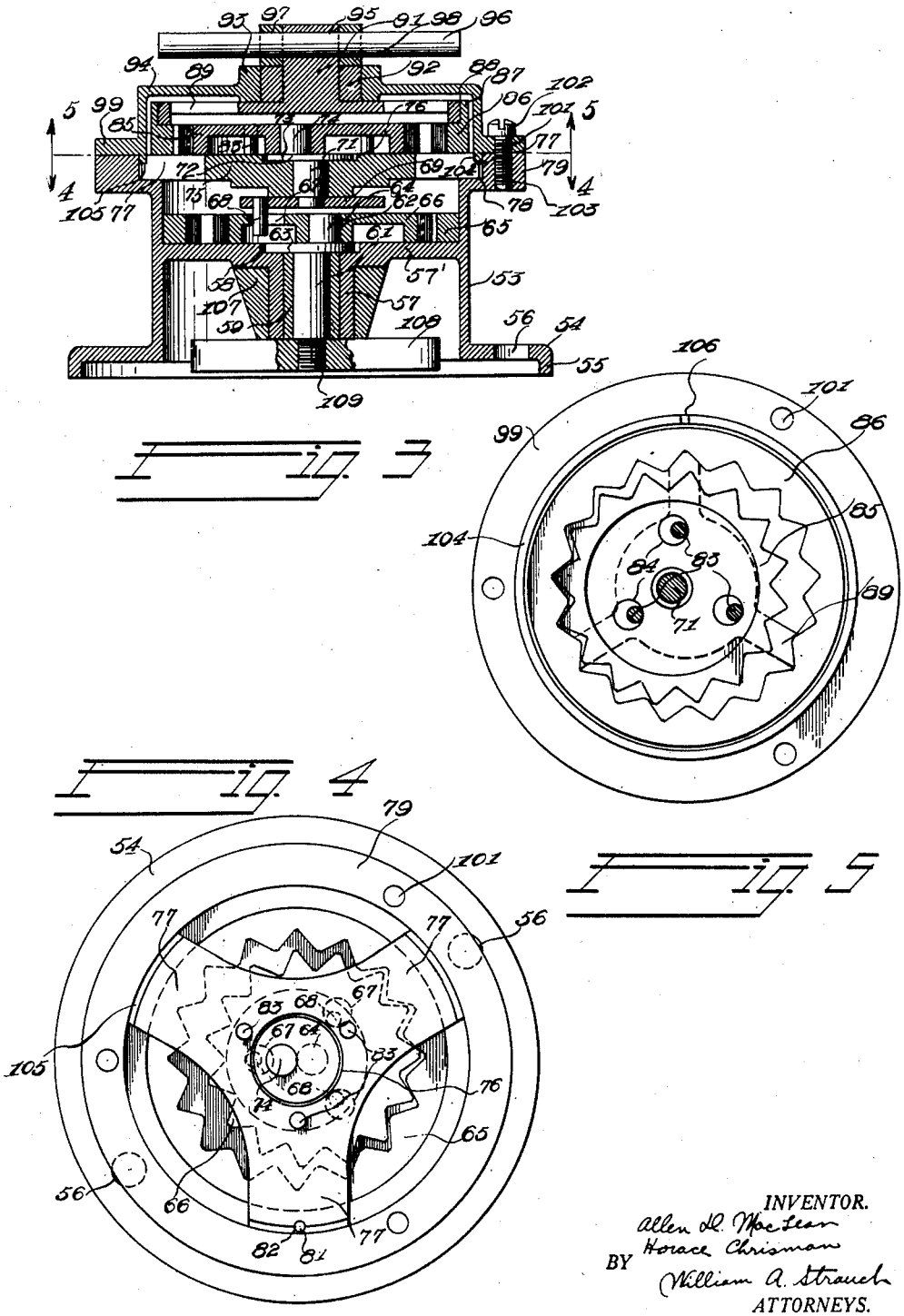
INVENTOR.
Allen H. MacLean
Horace Chrisman
BY William A. Strauch
ATTORNEYS.

Patented Nov. 17, 1931

1,831,903

UNITED STATES PATENT OFFICE

HORACE CHRISMAN AND ALLEN D. MacLEAN, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

REDUCTION GEARING

Application filed June 21, 1928. Serial No. 287,238.

This invention relates to reduction gearing for meters particularly of the type in which it is desired to secure a very large reduction between the metering mechanism and the integrating mechanism. Meters of this type are desired in measuring the flow of water, for example. In such meters relatively large volumes are measured and it is desirable to have each unit of the integrating mechanism represent a comparatively large volume. It will be readily understood that in order to secure this result reduction gearing must be interposed between the meter mechanism and the integrating mechanism that will greatly reduce the movement of the meter mechanism.

The introduction of reduction gearing sufficient to secure the desired relatively large reduction introduces difficulties that it is the purpose of this invention to avoid. Said difficulties arise due to the fact that the water passing through the meter and ordinarily contacting with the gears and bearings of reduction gearing carries with it gritty particles that cause undue wear between the gear teeth and in the bearings for the parts of the reduction gearing. The magnitude of this action is roughly proportional to the speed at which the parts move and to the extent to which the water carrying said gritty particles is free to contact with the parts of the reduction gearing.

The primary object of this invention is to avoid the difficulties just referred to, and to provide a reduction gearing that gives the desired large reduction between the meter mechanism and the integrating device in which the parts move relatively slowly and smoothly and in which they are so mounted that access of the gritty particles to the parts of the reduction gearing is substantially prevented.

A further object of this invention is to provide a reduction gearing for arrangement between the meter mechanism and an integrating mechanism device that is mounted in a casing that may be inserted and removed as a unit so that the replacement of the reduction gearing may be effected in a simple and expeditious manner.

A still further object of the invention is to provide a reduction gearing for meters in which all the parts thereof are firmly supported on relatively large flat surfaces and in which the movement of the parts takes place in planes that are disposed parallel to each other, thus avoiding the use of parts that wobble and shift their position from one plane to another plane that is inclined thereto.

A still further object of the invention is to provide a reduction gearing for meters in which the parts thereof do not rapidly rotate, but in which such parts as do rotate, move relatively slowly though the meter mechanism may operate rapidly.

A still further object of this invention is to provide a reduction gearing for meters which in its construction comprises means for substantially preventing access of suspended material in the water to said gearing.

A still further object of this invention is to provide a gearing for meters which is of maximum simplicity, durable and efficient and reliable in operation.

A still further object of this invention is the provision of a meter casing which is comparatively cheap of construction and better suited for its intended purpose than meter casings heretofore provided.

In the accompanying drawings forming a part of this application, we have shown certain physical embodiments of our invention, although without intent to limit ourselves thereto since the same are intended to be merely illustrative and not restrictive.

Referring to the drawings:—

Figure 1 is a vertical sectional view through a meter disclosing a preferred form of my invention.

Figure 2 is a top plan view of the reduction gearing unit.

Figure 3 is a vertical sectional view of the gearing unit illustrated in Figures 1 and 2.

Figure 4 is a view taken on the plane represented by line 4—4 in Figure 3, and

Figure 5 is a view taken on the plane represented by line 5—5 in Figure 3.

Referring to the drawings by reference characters in which like characters designate like parts 10 represents the meter casing which may be of any suitable or desired shape and size.

As shown in Figure 1, said casing is provided with an internal seat 11 to receive the metering mechanism. The portion of the casing above said seat is designed for the reception of the reduction gearing and the other portion for the meter mechanism. The metering mechanism includes a pair of hollow non-corrodible members 12 and 13 fitting accurately together and preferably presenting a slightly tapered exterior surface for fitting snugly in the casing. Said members form a meter chamber between them. The interior of the metering chamber is shaped in the usual manner for the reception of nutating disk 14 and its central ball 15. The members 12 and 13 are preferably constructed of forged brass which provides a very desirable chamber for the reason that it is closer grained than prior sand cast chambers thus being leak-proof and is also closer to finished size thus necessitating less finishing operations than that required in former sand cast chambers.

Furthermore, a forged brass chamber resists electrolytic action and acid and the surfaces are free of the grit usually present in sand cast chambers, which grit has a detrimental effect on the operating parts housed thereby. At the same time, a chamber formed of forged brass gives a much greater length of service than similar sand cast structures. Members 12 and 13 are provided exteriorly thereof with the usual inner and outer flanges 16 and 17 respectively.

Casing 10 is provided with the usual inlet and outlet nipples and contains adjacent the base of nipples 18 and 19, a seat 21 for the reception of suitable packing rings 22 against which the base of a frangible cap 23 is secured by means of suitable bolts 24. Metering chamber comprising members 12 and 13 is, as shown in Figure 1, disposed between seat 11 and packing rings 22. As in usual practice, a suitable screen 25 is secured within casing 10 adjacent inlet nipple 18.

The top of casing 10 is formed with a web 26 provided with an outwardly diverging flange 27 and further provided centrally of flange 27 with a vertically apertured externally threaded boss 28 which as indicated, is provided with a dished outer end 29. Flange 27 defines with casing 10, a shoulder 31 for reception of a bell shaped member 32 upon the outer edge of which is supported the casing 33 of an integrating train or device. Pivotally secured to said casing, as at 34, is an observation cover 35.

Rotatably supported in the aperture of boss 28 is a spindle 36 provided with an upper reduced section 37 to which is secured a pinion 38 meshing with a gear 39 within member 32 which gear is operatively connected to the integrating train within casing 33 in well known manner. Threaded on boss 28 and defining therewith a stuffing box, is a cap 41 between which and the outer end of boss 28 is disposed a packing 42 for preventing the ingress of water to the integrating mechanism as well as serving to retain lubricant for spindle 36. Carried by the lower end of spindle 36 is a fork or coupling element 43 provided with transversely alined apertures 44 for a purpose hereinafter to be explained.

As in usual practice, ball 15 is provided with an axial pin 46 commonly called the control bar, and which, as shown further, functions as a bolt for holding the parts, of which ball 15 is composed, together. To this end, said pin is provided intermediate the ends thereof with a flange 47 seated in a recess 48 in one of the sections of ball 15 and said pin is threaded at the lower end thereof for engagement by a nut 49 seated in a recess 51 in the other section of ball 15.

As is well understood by those skilled in the art, the flow of water or other fluid from inlet nipple 18 to outlet nipple 19 through the intermediately disposed metering chamber imparts a wabbling motion to nutating disk 14 which in turn imparts motion to pin 46 through ball 15, the motion of pin 46 being communicated to the integrating train or registering mechanism through spindle 36 and meshing pinion 38 and gear 39 by an interposed reduction gearing unit or mechanism and which forms the principal feature of our present invention about to be described.

The reduction gearing unit comprises a cylindrical casing 53 (Figure 3) provided with a comparatively wide base flange 54 for seating engagement upon the outer top surface of flange 17 of member 12 and a downturned flange 55 arranged to engage the periphery thereof. Flange 54 is apertured as indicated at 56 for the reception of screws 56' engaged in suitable taps in flange 17 for detachably securing casing 53 thereto. It will accordingly be seen that by the provisions of the downturned flange 55 of flange 54, casing 53 is quickly and accurately located relative to the metering chamber and thus the interconnected operating parts are certain to be placed in proper alinement.

Integrally formed with casing 53 is a longitudinally disposed intermediate partition or shelf 57' provided centrally thereof with a downwardly extending sleeve 57, partition 57' adjacent the outer end of sleeve 57 being provided with a recessed bearing portion 58. Fixedly secured within sleeve 57 is a bushing 59 within which is rotatably journalled the shaft 61 of a crank 62. Said crank comprises shaft 61, an integral disk member 63 seating in recessed bearing portion 58 and an eccentrically positioned crank pin 64 preferably integral with disk member 63.

Fixed in casing 53, preferably by friction through forced fit, is an internal gear 65, which as shown in Figure 3, may bear against partition 57'. Journalled on pin 64 is an external gear 66 for rotation on pin 64 and translatory motion toward and from the teeth of gear 65. Gears 65 and 66 are provided with unequal numbers of teeth, in the particular illustration gear 65 is provided with 16 teeth and gear 66 is provided with 15 teeth. However, this is not essential, it being only necessary that the two gears be provided with unequal numbers of teeth for imparting greatly reduced rotation to one of the gears by repeated successive engagements of the teeth on the gears.

External gear 66 is provided with a plurality (preferably three) of equally spaced apertures 67 for the loose reception of the inner ends of a like number of pins 68 rigidly supported in a rotatably mounted disk member 69 which is fixed to and rotatable with a shaft 71 of a crank 72, further comprising an eccentrically positioned crank pin 74 that may be integral with disk 73. The diameter of apertures 67 is substantially the same as the diameter of the circle upon which the center of the crank pin 64 moves. In view of this fact, the pins 68 are each in tangential engagement with the wall of one of said apertures at all points of movement of the gear 66. By this arrangement said gear is held at a plurality of points in all of its positions. This prevents a chattering of the gear and insures correct and smooth operation.

Shaft 71 is rotatably journalled in a bearing member 75 preferably provided with a depressed seating portion 76 for the reception of disk 73. Member 75 is non-rotatively mounted in casing 53, and may be constructed in any manner. In the drawings, said member has a plurality (preferably three) of radiating supporting arms 77 (Figure 4) the outer ends of which detachably rest upon an annular seat 78 provided in an outwardly extending relatively heavy flange 79 on the upper portion of casing 53. As shown in Figure 4, casing 53 may be further provided with a pin 81 extending outwardly from the base of seat 78 for reception in an aperture 82 in one of the arms 77 to prevent rotation of bearing member 75, relative to casing 53. Any other arrangement to fix said member to the casing may be used.

Fixed in bearing member 75 adjacent depressed portion 76 is a plurality (preferably three) of outwardly projecting pins 83, whose outer ends loosely engage within a like number of equally spaced apertures 84 in an external gear 85 which is centrally journalled on crank pin 74 of crank 72. The apertures 84 are of a diameter substantially equal to the diameter of the circle in which the center of the crank pin 74 travels so that the pins 83 are in engagement with the walls of said apertures respectively at all positions of the gear 85. In operation, said pins serve the same purpose as the pins 68 above referred to, and co-operate with the apertures that receive them in the manner above described with reference to the apertures 67. Gear 85, due to the engagement of fixed pins 83 in the apertures 84 thereof, is restrained against rotation and is consequently subjected only to a bodily shifting motion caused by eccentrically mounted pin 74 on which it is journalled and on which it turns.

The teeth of gear 85 upon shifting movement thereof engage and disengage successively the teeth of a rotatable internal gear 86 provided with a number of teeth unequal to those on gear 85. In the particular illustration, gear 85 is provided with 16 teeth and gear 86 is provided with 17 teeth. However, a difference of only one tooth is not absolutely essential.

Gear 86, as shown in Figure 3, may be provided with an outwardly extending peripheral flange 87 for force fit engagement with the outer face of the rim 88 of a spider 89 provided centrally thereof with an outwardly projecting stud 91 journalled for rotation in a bushing 92 fixedly secured in a boss 93 integrally formed on a cover 94. Stud 91 is provided with a transverse bore 95 adjacent the outer end thereof for the reception of an actuating pin 96 which is extended through alined apertures 97 in a securing washer 98 engaging the outer end of stud 91 and bearing on bushing 92.

Cover 94 is provided with a laterally extending flange 99 for seating engagement on flange 79, flange 99 being provided with a plurality of apertures 101 for the reception of screws 102 threadedly engaged in taps 103 in flange 79 for securely holding cover 94 on casing 53.

Cover 94 is provided with an inwardly extending locating flange 104 for engagement with the periphery of seat 78 and the outer ends of arms 77 are recessed as indicated at 105 for accommodating this flange, flange 104 being provided with a recess 106 (Figure 5) for receiving the upwardly projecting outer end of pin 81.

As in common practice, a conical contacting roller 107 for engagement by and controlling the movement of pin 46 is journalled on sleeve 57 being retained thereon by a dog crank 108 detachably threaded on a reduced threaded extension 109 of shaft 61, the crank being disposed in the line of movement of pin 46 whereby movement is transmitted to the gearing mechanism.

In the operation of the gearing mechanism disclosed, the gearing mechanism comprising the casing 53 and cover 94 is introduced into casing 10 with flange 54 and inturned portion 55 thereof engaged with outer flange 17 of the metering chamber as illustrated in Figure 1, and secured thereto by means of the screws 56' with pin 46 in engagement with contact roller 107 and with the opposite ends of pin 96 engaged in apertures 44 of coupling element 43.

Upon fluid flowing through the metering chamber formed by members 12, and 13 the nutating disk 14 is set into motion in well known manner which in turn imparts rotary motion to pin 46 about roller 107 in which motion pin 46 engages dog crank 108 imparting rotation to shaft 61 which in turn imparts through the eccentric pin 64 an oscillating movement to external gear 66 the teeth of which, due to the oscillating movement, are successively brought into contact with the teeth of fixed internal gear 65. Due to the unequal number of teeth in the two gears, a slow rotary motion is imparted to gear 66 at a speed depending upon the difference in the number of teeth in the two gears, which in the illustration, is only one.

Gear 66, due to the driving connection by pins 68 in apertures 67 imparts rotation to disk 69 which in turn imparts rotation to shaft 71 and consequently the disk 73. The eccentric pin 74 is bodily revolved causing bodily movement of external gear 85 journalled thereon.

Gear 85 is restrained against rotation by the engagement of fixed pins 83 carried by bearing 75 and as a consequence gear 85 is subjected only to an oscillating motion but does not rotate. Its teeth successively engage and disengage the unequal number of teeth in rotatable internal gear 86 imparting a very slow rotary motion thereto, which through spider 89 imparts a like rotation to pin 96 which rotation is transmitted to the integrating train through the connection of pin 96 to coupling element 43, before referred to. The co-operating external and internal gears having unequal numbers of teeth cause a slow, differential progression, and the two differential gears being arranged in series, the effect of the one is multiplied by that of the other. The speed reduction is consequently great and the rotatary movement of the parts is very slow, thus eliminating high speed stuffing boxes and reducing wear due to friction occasioned by the continuous inter-engagement of rapidly rotating elements. The gearing and associated moving parts are a minimum in number and are all operatively and compactly housed for expeditious assembly as a unit. Inasmuch as the reduction gearing is housed in casing 53, no detrimental action by suspended gritty matter, in which the gearing is submerged can occur since the casing may be so constructed that such matter can not enter it, though the water may. It may be noted that the gear ratio varies depending upon whether it is the inner or the outer gear which is held against rotation. If the inner gear is restrained from rotation, then it becomes the standard about which rotation is counted and the ratio is determined by the number of its teeth. However, if the outer gear be restrained against rotation, the shaft to which the inner gear is secured will be driven at a ratio determined by the number of teeth on the outer gear. Thus with gears of 36 and 39 teeth, the ratio will be 12 to 1 when the inner gear is held and 13 to 1 when the outer gear is held.

Applying the above theory to the construction herein disclosed in which gear 65 is fixed and provided with 16 teeth, and gear 66 is rotatable and provided with 15 teeth the ratio is 16 to 1.

In the second set of gears, gear 85 is held against rotation and provided with 16 teeth while gear 86 is rotatable and provided with 17 teeth and the ratio is 16 to 1. The speed reduction due to the combined action of the two sets of gears will, accordingly, be the product of the two reductions of 16 to 1 or 256 to 1 which is one of the ratios now existing in standard meters, the others of which are 144 to 1 and 168 to 1, which ratios can be established by properly proportional and related gears.

It is to be noted that the provision of a plurality (preferably three) of pins 68 for the rotary driving connection between gear 66 and disk 69 and a like number of pins 83 for restraining gear 85 from rotary motion, are essential to provide a continuous, uniform and accurate movement of the various interconnected parts of the gear train, because as above pointed out, prevent backward movement or stutter.

From the foregoing disclosure, it will be appreciated that a reduction gearing is provided which is neatly, accurately, and compactly housed within a forged brass casing which is admirably adapted to be conveniently inserted in or withdrawn from a meter casing provided with a well known form of metering mechanism and integrating device and that the reduction gearing mechanism is of great simplicity and compactness so that it may be produced at little cost in manufacture. At the same time, there is little likelihood of the operating parts getting out of working order.

It will be further seen that the teeth on the gears are relatively wide and shallow so as to prevent jamming.

It will be observed further that the gears are housed in the casing 53 and that this casing may be closed so as to prevent the entry of solid particles therein, though water may enter said casing around the bearings extending therefrom to avoid the use of lubricant in said casing.

It will be observed further that the gears within the casing are all disposed flatwise upon supporting shelves or partitions. Their operation may thus be extremely smooth and no binding may readily take place between any of the moving parts. At the same time the reduction gearing within the casing 53 is composed of parts that partake of short oscillating or combined oscillating and very slow rotary movement, thus avoiding the use of gears that move rapidly and are in continuous engagement with other relatively rapidly moving gears.

While we have disclosed a specific embodiment of our invention, it is to be understood that we are not limited to the details thereof but may make such changes or alterations as fairly fall within the scope of the sub-joined claims.

Accordingly, what we claim and desire to secure by United States Letters Patent is:—

1. A reduction gearing for meters having an integrating mechanism, said gearing comprising a shaft operated by the meter mechanism, a crank on said shaft, a gear journalled on said crank, a fixed gear having a slightly different number of teeth surrounding said first named gear, a second shaft, means including a plurality of pins movable with said second shaft and engaging said first named gear, a crank on said second shaft, a gear journalled on said last named crank, a plurality of fixed pins to prevent rotation of said last named gear while permitting the movement thereof under the influence of said last named crank, a movable gear having a slightly different number of teeth from said last named gear and arranged to be driven thereby and means carried by said movable gear whereby it may be operatively connected to the integrating mechanism.

2. A reduction gearing for meters having an integrating mechanism, said gearing comprising a shaft operated by the meter mechanism, a crank on said shaft, a gear journalled on said crank and having openings, a fixed gear having a slightly different number of teeth surrounding said first named gear, a second shaft, means including a plurality of pins movable with said second shaft and engaging the openings in said first named gear, each of said openings having a diameter substantially equal to the diameter of the circle in which the center of said crank moves, a crank on said second shaft, a gear journalled on said last named crank and having openings, a plurality of fixed pins disposed in the openings in said last named gear, each of said last mentioned openings having a diameter substantially equal to the diameter of the circle in which the center of said last named crank moves, a movable gear having a slightly different number of teeth from said last named gear and arranged to be driven thereby, and means carried by said movable gear whereby it may be operatively connected to the integrating mechanism.

3. In a meter construction, comprising a meter casing enclosing a metering mechanism and a housing therefor, a driving element connected to said mechanism, and an integrating mechanism spindle journalled through the housing; a reduction mechanism interposed between said driving element and said spindle, and a casing enclosing said reduction mechanism; said casing being seated upon the housing, a horizontal platform formed integral with the side walls of the seated casing and intermediate the top and bottom thereof, a horizontal annular seat formed in the casing side wall and spaced above said platform, and a second platform fixedly mounted on said seat; and said reduction mechanism comprising a vertical shaft detachably connected with the driving element and journalled through said first platform, an external gear supported on the first platform and eccentrically connected to said shaft, an internal gear fixedly supported on the same platform concentric with said shaft and in partial engagement with the internal gear, another set of external and internal gears horizontally mounted upon said second platform, a driving connection between the first and second set of gears, an upper shaft journalled through the top side of the casing and connected with said second set of gears, and a detachable connection between said upper shaft and said spindle of the integrating mechanism.

4. In the combination defined in claim 3, said upper set of gears comprising an external gear provided with eccentric driving means and with means for fixing it against rotation while permitting it to oscillate, and an internal gear concentrically mounted and provided with means for rotating said upper shaft.

5. In the combination as set forth in claim 3, said casing being horizontally split near said second platform to form two sections having adjacent and cooperatively engaged flanges.

6. In a meter of the type having a metering mechanism, a pin actuated by said mechanism, and integrating mechanism including a rotary spindle spaced from said pin; the combination of a reduction gearing interconnecting said pin and said spindle, a casing forming a part of said reduction gearing, a shaft adjacent one end of said casing and adapted to be rotated by said pin, a second shaft adjacent the other end of said casing and adapted to actuate the rotary spindle of said integrating mechanism, two sets of planetary gears connecting said shafts, one set of said gears being of the type wherein the inner gear partakes of an oscillatory and rotary motion and the outer gear remains stationary, the other set of said gears being of the type wherein the inner gear partakes of an oscillatory motion but does not rotate and the outer gear rotates.

7. The combination as set forth in claim 6 wherein the said casing is formed of two parts detachably secured together, one set of planetary gears being carried by each part thereof.

8. The combination as set forth in claim 6 wherein the said casing is formed of two parts detachably secured together, one set of planetary gears being carried by each part, a spider non-rotatably secured in said casing adjacent the line of division between the parts of said casing, said spider supporting a shaft, said shaft operatively connecting the two sets of planetary gears.

9. The combination as set forth in claim 6 wherein a shaft is supported by said casing between the two sets of planetary gears, said shaft having an eccentric stub shaft for engagement with the inner gear of one set, and a plurality of pins for engagement in corresponding openings in the inner gear of the other set.

10. The combination as set forth in claim 6 wherein a spider is supported by said casing between said sets of gears, said spider carrying a shaft, said shaft having means on opposite ends thereof for engagement with the respective inner gears of the two sets of planetary gears for transmitting motion of one to the other, and means on said spider engaging one of said inner gears to prevent rotation thereof.

11. The combination as set forth in claim 6 wherein the said casing is formed of two parts detachably secured together, one set of planetary gears being carried by each part, a spider frictionally secured to one of said parts, and means carried by said spider for transmitting motion from the inner gear of one set of planetary gears to the inner gear of the other set.

In testimony whereof we affix our signatures.

HORACE CHRISMAN.
ALLEN D. MacLEAN.